Oct. 28, 1941.          E. A. ELGE          2,260,833
COOLING MEANS FOR ELECTRICAL INDUCTION APPARATUS
Filed Dec. 1, 1939          2 Sheets-Sheet 1
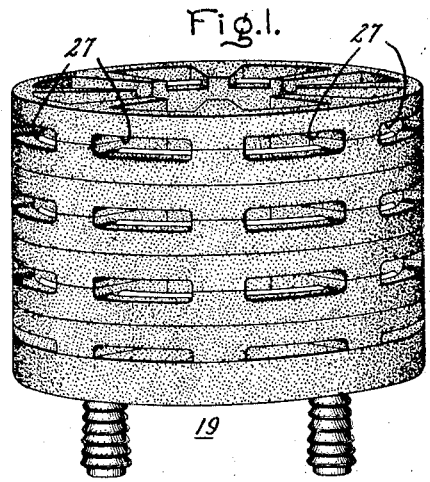
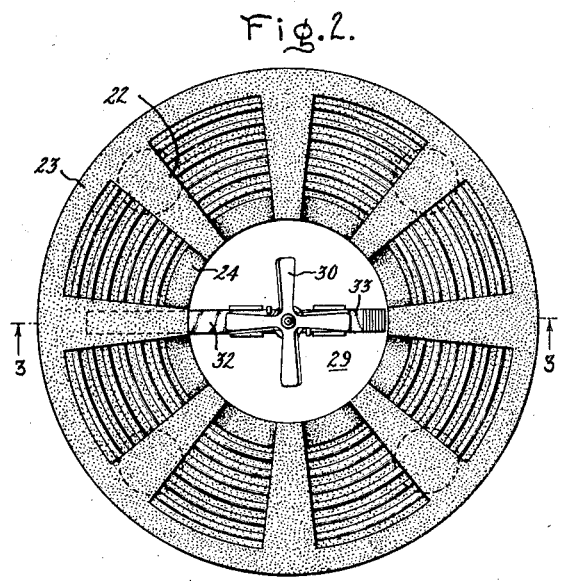
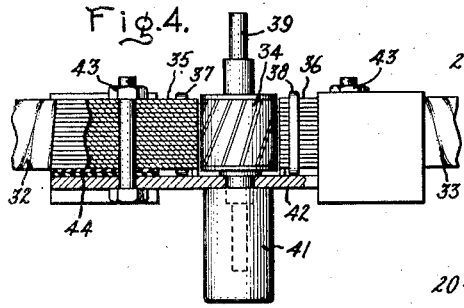
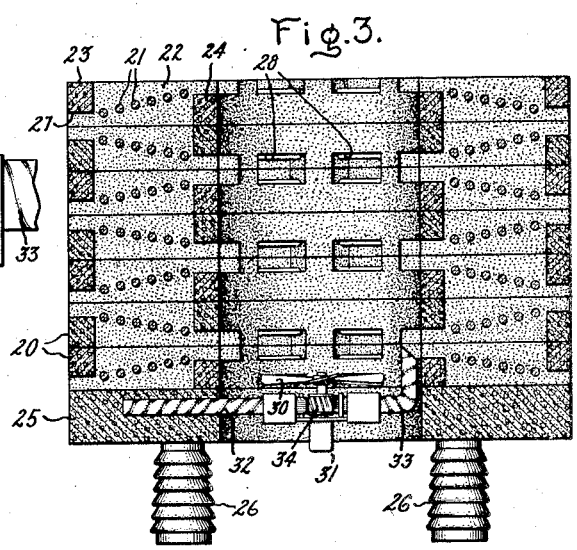
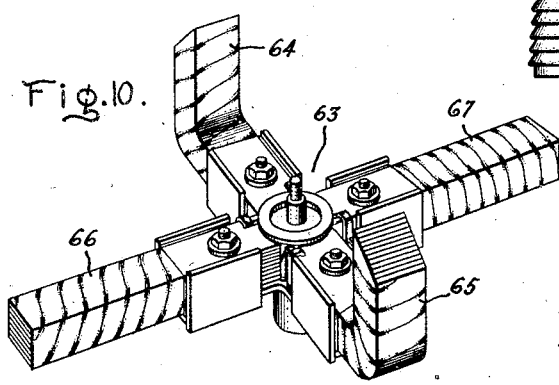
Inventor:
Ernest A. Elge,
by Harry E. Dunham
His Attorney.

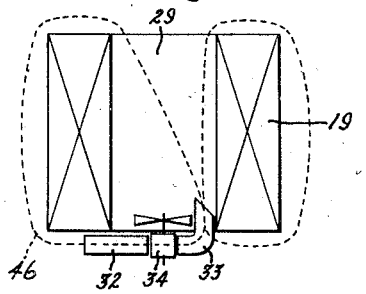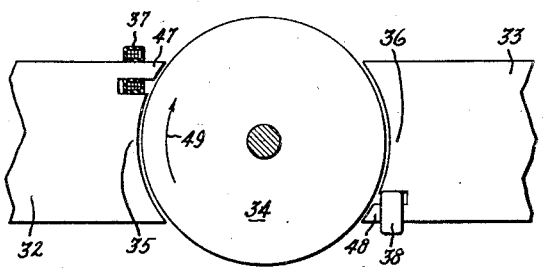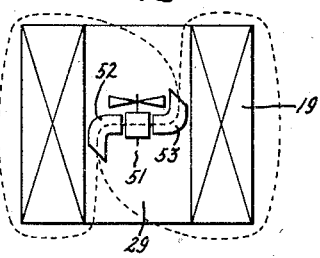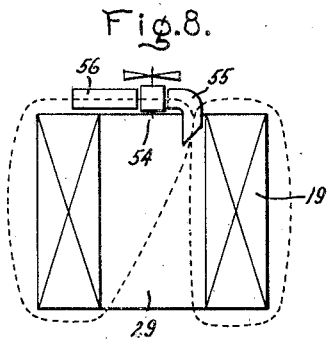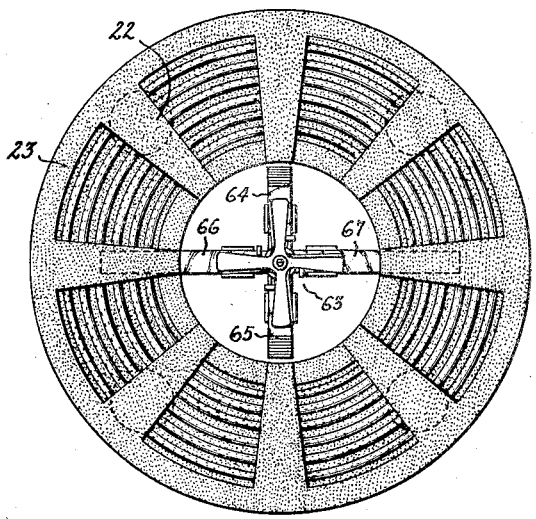

Patented Oct. 28, 1941

2,260,833

UNITED STATES PATENT OFFICE 2,260,833

COOLING MEANS FOR ELECTRICAL INDUCTION APPARATUS

Ernest A. Elge, Pittsfield, Mass., assignor to General Electric Company, a corporation of New York Application December 1, 1939, Serial No. 307,066

2 Claims. (Cl. 171—119)

This invention relates to cooling of the electrical windings of induction apparatus and while it is not necessarily limited thereto, it is particularly adaptable to reactors and especially to current-limiting reactors.

Current-limiting reactors are usually provided in an electrical power circuit for preventing the current flowing therein from increasing to abnormally high values upon the occurrence of a system fault such as a short circuit. Such reactors usually comprise a plurality of wound layers of copper conductors suitably supported in a spaced relationship by a non-magnetic structure of insulating material. Inasmuch as the current carrying capacity of the reactor is limited by the heating characteristics thereof, a supporting structure is provided with a plurality of openings to allow free circulation of air or other cooling fluid therethrough. In the case of enclosed reactors submerged within an oil container, the heat is carried from the conductors by convection currents which heat is then dissipated from the side walls of the container or from suitably arranged heat exchangers. By providing means for increasing the circulation of cooling medium over the conductors, the current carrying capacity of the reactor may be considerably increased, or the size and amount of material used in the reactor structure may be decreased and the cost of manufacture thereof correspondingly lowered.

It is a general object of this invention to provide a new and improved impeller means for increasing the circulation of cooling medium over the conductor windings of electrical induction apparatus.

It is a further object of the invention to provide a new and improved impeller means for increasing the circulation of cooling medium over the windings of electrical induction apparatus which means comprises a minimum number of parts and is automatically operable in accordance with the load on the reactor without the use of auxiliary control apparatus.

More specifically, it is an object of this invention to provide a new and improved motor for use with electrical induction apparatus which motor is adapted to be energized from the magnetic flux produced by the windings of the induction apparatus without the use of special stator energizing windings.

In the illustrated embodiment of the invention an air-core current-limiting reactor is provided with a suitably arranged fan for increasing the circulation of cooling medium over the conductor turns. The motor for driving the fan comprises a squirrel cage type rotor and a stator structure comprising a plurality of magnetic flux collector arms so disposed with regard to the magnetic field of the reactor that a certain portion of the flux created thereby passes through the arms for energizing poles adjacent the rotor. The pole faces are slotted and provided with shading coils so that a revolving field is created for causing rotation of the rotor. By this arrangement the motor and hence the fan is driven at a speed directly proportional to the load carried by the reactor.

For a consideration of what I believe to be novel and my invention, attention is directed to the following description and the claims appended thereto taken in connection with the accompanying drawings. In the drawings Fig. 1 is a perspective view of a current limiting reactor embodying my invention; Fig. 2 is a top view of the reactor shown in Fig. 1; Fig. 3 is a cross-sectional view of the reactor taken along the line 3—3 of Fig. 2; Fig. 4 is an enlarged view partly in section of the cooling fluid impeller motor illustrating certain structural details thereof; Fig. 5 is an enlarged diagrammatic plan view of the motor illustrating certain features thereof; Fig. 6 is a diagrammatic view similar to Fig. 3 with the flux path plotted; Figs. 7 and 8 are diagrammatic views similar to Fig. 6 illustrating modifications of the invention; Fig. 9 is a plan view of a reactor provided with a cooling fluid impeller motor according to a preferred modification of the invention; Fig. 10 is an enlarged view of the impeller driving motor illustrated in Fig. 9.

Referring to the drawings in Figs. 1, 2 and 3, is shown a typical air core reactor 19, being of the type specifically described in Patent No. 1,317,003 Creighton, issued September 23, 1919, and assigned to the General Electric Company, the assignee of the present application. The reactor is made up of a plurality of similar ring shaped sections 20 each section comprising a single coil or layer of a conductor 21 embedded in and supported by the spider portions 22 extending radially between the outer ring portion 23 and the inner ring portion 24. The conductor coils are suitably connected together in series and provided with terminals (not shown) for connection to an electrical circuit. The plurality of stacked sections 20 are mounted upon a ring shaped base portion 25 which in turn is supported by suitable insulators 26. Suitably spaced openings 27 and 28 are provided between the outer and inner ring portions 23 and 24, respectively, of the adjacent sections 20 to allow free circulation of ventilating air into the reactor structure for cooling the conductor coils thereof. The inner walls of the aligned inner rings 24 and base 25 define a central opening 29 extending vertically through the reactor assembly for further enhancing the circulation of ventilating air through the structure. As described in the above mentioned patent, the supporting structure comprises a suitable insulating plastic such as concrete.

For improving the circulation of cooling medium, such as air, through the reactor structure, I provide an impeller or fan within the lower portion of the central opening 29 and driven by a motor 31. In accordance with my invention the motor 31 comprises a stator structure including a pair of flux collecting arms 32 and 33 and an intermediate rotor 34 which may be of the squirrel cage type. As shown more clearly in Fig. 4, the arms 32 and 33 are made up of stacked laminations which terminate adjacent the rotor 34 providing field poles 35 and 36 therefor. The pole faces are suitably slotted and are provided with short circuited shading windings 37 and 38, respectively, the latter being more clearly indicated in the diagrammatic view Fig. 5. The rotor 34 is suitably mounted within the air gap between the poles 35 and 36 and, as illustrated, the lower end of the shaft 39 is journalled within a bearing provided in housing 41 depending from the plate 42. The latter plate is fastened by means of bolts 43 to the stator arms 32 and 33, and is insulated therefrom by insulating spacers 44. It is to be understood that all motor parts except the rotor and the steel laminations of the flux collector arms are of a non-magnetic material.

The outer extremity of the flux collector arm 33 extends at right angles with respect to the pole portion 36 thereof and projects upwardly within the central opening 29 beyond the ends of the impeller blades. The other arm 32 is straight and extends outwardly beneath the lower winding section and, as illustrated, the outer extremity thereof may be embedded in the base portion 25 for anchoring the motor securely in position.

Upon the energization of the reactor coils, a magnetic field will be set up encircling the windings and due to the high permeability path provided by the flux collector arms 32 and 33, a certain amount of the field flux will circulate through the arms providing excitation for the motor as indicated by the dotted line 46 in Fig. 6. The flow of flux through the motor poles and rotor is the same as that in the conventional shaded pole fractional horsepower motor, the function of the shading coil being the same in each instance. As illustrated in Fig. 5, the shaded pole portions 47 and 48 of the main poles 35 and 36, respectively, produce a flux which lags the flux of the main poles by a certain angle and results in a relatively weak revolving field to give a small starting torque to the rotor 34. Rotation of the rotor is in the direction of the main pole toward the shaded section and is indicated by the arrow 49. The size and shape of the flux collectors are correctly proportioned to divert a proper amount of flux. By this arrangement, when the current through the winding being cooled increases, more flux passes through the motor, fan speed increases, and a larger volume of cooling medium is circulated. With no current flowing through the reactor winding, the fan does not rotate.

While I have shown the motor arranged at the lower end of the reactor core, it is obvious that the motor may be arranged in any other suitable position with respect thereto. For example, in Fig. 7 the motor 51 is shown arranged at an intermediate point within the core, the outer ends of the flux collecting arms 52 and 53 extending in opposite directions so as to provide a suitable high permeability path for a portion of the flux of the reactor field. In Fig. 8 the motor 54 is shown mounted at the upper end of the reactor with one of the flux collecting arms 55 extending downwardly into the core opening while the other arm 56 extends laterally across the top of the winding.

It is obvious that the invention is not limited to the use of only a single pair of poles for the motor but any other suitable number of poles may be provided. In the preferred embodiment illustrated in Figs. 9 and 10, a four-pole motor 63 is provided having diametrically opposite flux collecting arms 64 and 65 similar to the arm 33, and diametrically opposite flux collecting arms 66 and 67 similar to the arm 32. The pole faces of these arms are provided with shading coils as described in connection with the preceding modifications.

Having described the principle of operation of my invention together with the apparatus which I now consider to represent the best embodiment thereof, I desire to have it understood that the apparatus shown is merely illustrative and that the invention may be carried out by other means.

What I claim as new and desire to secure by Letters Patent of the United States is:

1. In combination with a supporting structure for a reactor winding including a plastic base member, said structure having a ventilating opening extending axially therethrough, a ventilating fan arranged within said opening, a motor for driving said fan comprising a rotor member and a pair of cooperating magnetic stator members, one of said stator members extending into said opening parallel with the axis thereof, the other of said stator members extending radially of said reactor and embedded in said base member.

2. A cooling system for a single-phase air core reactor winding embedded in a plastic supporting structure and having an axial opening therethrough, said system comprising an impeller arranged within said opening for forcing cooling fluid over said winding, a motor for driving said impeller comprising a pair of spaced apart aligned magnetic flux collector arms arranged longitudinally within the magnetic field of said winding, at least one of said arms being embedded in said supporting structure, and a rotor arranged between and rotatably supported upon said spaced apart arms.

ERNEST A. ELGE